Jan. 22, 1963    B. I. ULINSKI    3,074,500
INDUSTRIAL TRUCK
Filed Nov. 25, 1960

INVENTOR.
BRONISLAUS I. ULINSKI
BY
ATTORNEY

United States Patent Office 3,074,500
Patented Jan. 22, 1963

3,074,500
INDUSTRIAL TRUCK
Bronislaus I. Ulinski, Flossmoor, Ill., assignor to The Yale and Towne Manufacturing Company, Stamford, Conn., a corporation of Connecticut
Filed Nov. 25, 1960, Ser. No. 71,717
6 Claims. (Cl. 180—14)

This invention relates to an industrial truck. More particularly, the invention relates to an industrial truck incorporating a hitch, or coupling, by which a trailer may be coupled rigidly to the truck so that the trailer and truck may be steered as an integral unit.

When a truck and trailer are coupled so as to be steerable as an integral unit, it is desirable that the fixed, or non-steerable, wheels of the truck be raised from the floor so that they do not rub laterally on the floor and interfere with the steering of the unit through cooperation between the steerable wheel of the truck and the fixed wheels of the trailer.

The purpose of the present invention is to provide a simple, inexpensive, but extremely efficient arrangement for raising the fixed wheels of the truck from the floor and for rigidly coupling the trailer to the truck. In accordance with the invention, this arrangement includes simple caster wheels which are adapted to be moved downwardly against the floor to raise the end of the truck carrying the fixed wheels whereby the fixed wheels are lifted from the floor and the end of the truck is supported on the caster wheels. As the caster wheels may swivel freely, they support the end of the truck without resisting or interfering with steering of the truck and trailer as a unit.

As a feature of the invention, the caster wheels and the coupling means are interconnected so that when the caster wheels are moved downwardly to lift the end of the truck and the fixed wheels, the coupling means are also actuated to couple the trailer rigidly to the truck. In a preferred form of the invention, the caster wheels and the coupling means are connected together by a simple, inexpensive linkage system, and the caster wheels and coupling means are actuated by the same simple hydraulic ram means.

Figure 1:
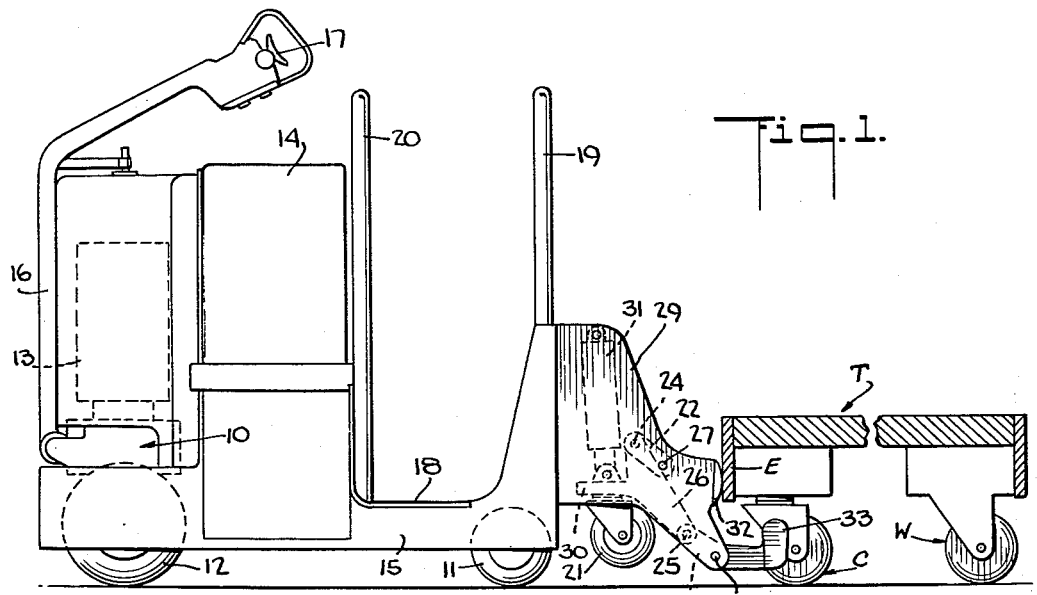
Figure 2:
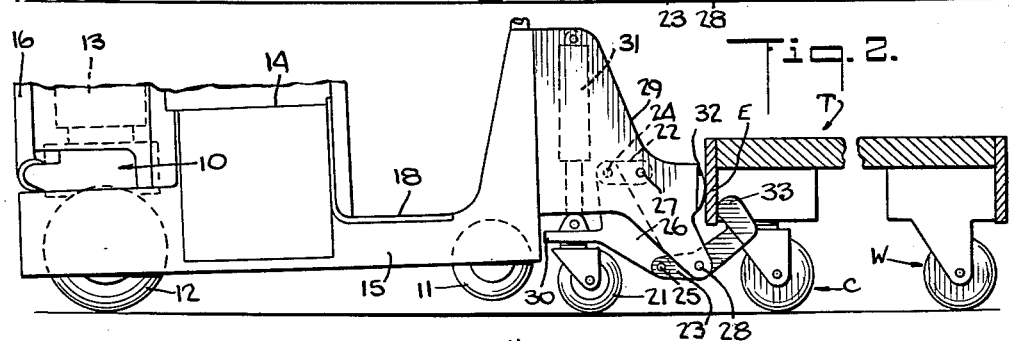
Figure 3:
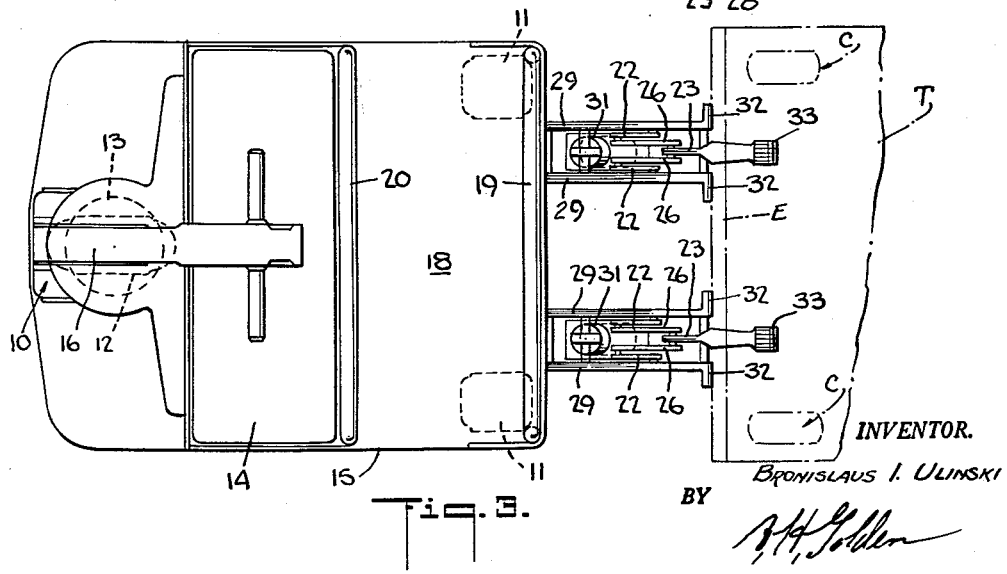

The invention and its advantages having been broadly described, a more detailed description of one embodiment of the invention is given hereafter by reference to the accompanying drawings, wherein:

FIG. 1 is a side elevational view of a truck constructed in accordance with the invention, and showing the truck in position adjacent a trailer preparatory to the truck being coupled to the trailer, FIG. 2 is a partial side elevational view similar to that of FIG. 1, but showing the caster wheels of the truck lowered to lift the fixed wheels of the truck from the floor and the coupling means actuated to couple the truck rigidly to the trailer, and FIG. 3 is a top plan view of the truck and part of the trailer, as shown in FIG. 1.

Referring to the drawings, the invention is shown incorporated in a "walkie" type truck having a combined steering and traction unit 10 at one end and fixed, non-steerable, wheels 11 at the other end.

The particular combined steering and traction unit 10 disclosed in the drawings is of the type described in my United States Patent No. 2,913,062, and includes a steerable traction wheel 12 and an electric traction motor 13 for driving the wheel 12. Batteries for operation of the motor 13 are conveniently housed in a compartment 14 which is carried by the truck frame 15.

The combined steering and traction unit 10 is adapted to be rotated bodily about a vertical steering axis by means of a pivotally mounted handle 16 to effect steering movement of the wheel 12, and the traction motor 13 is adapted to be controlled by suitable manual controls 17 mounted on the end of the handle 16. The controls 17 may be of the type described in my United States Patent No. 2,790,879.

By pivoting the handle 16 forwardly in front of the truck, the truck may be steered and controlled by an operator walking in front of the truck. When the handle is positioned as shown in the drawings, the truck may be steered and operated by the operator while standing on a platform 18 provided on the frame 15. The brakes of the truck may be applied by movement of the handle 16 to an extreme horizontal position or an extreme vertical position, as described in my United States Patent No. 2,913,062. Handrails 19 and 20 secured to the frame of the truck and positioned in back and front of the platform 18, are adapted to be grasped by the operator to steady himself when operating the truck from the platform 18.

In accordance with the invention, the rear end of the truck is provided with a pair of transversely spaced caster wheels 21 which are adapted to be moved vertically downwardly against the floor to lift and support the rear end of the truck with the fixed wheels 11 of the truck raised from the floor, as shown in FIG. 2, so that they cannot resist, or interfere, with subsequent steering of the truck and trailer as a unit. As the caster wheels 21 are free to swivel, they are capable of supporting the end of the truck while offering substantially no resistance or interference to the steering of the truck and trailer as a unit.

Each of the caster wheels 21 is conveniently mounted for such vertical movement by means of a simple parallelogram linkage system formed by upper and lower parallel links 22 and 23, which are pivotally secured at 24 and 25 to upper and lower ends of a pair of links 26, and are pivotally secured at 27 and 28 to a pair of vertical plates 29 which are rigidly secured to and extend from the rear of the truck. The caster wheels 21 are each secured to a suitable horizontal mounting plate 30, which, in turn, is welded, or otherwise rigidly secured, to the links 26. Each of the parallelogram linkage systems formed by the links 22 23, and 26, therefore, supports one of the caster wheels 21 for vertical movement while maintaining the vertical caster axis of the wheel in a vertical position.

Each of the caster wheels 21 is adapted to be moved vertically by a suitable hydraulic ram 31, which is pivotally secured at its lower end to the mounting plate 30, and at its upper end to the plates 29. As best shown in FIG. 3, the links 22, 23 and 26, and the hydraulic ram 31 for each caster wheel 21, are disposed in the space between the plates 29 so that the plates act as guards to minimize the danger of injury to the operator, or other personnel, during movement of the links and ram.

In order for the truck and a trailer, such as indicated at T, to be steered as a unit, the trailer must be coupled rigidly to the truck. As a feature of the invention, novel coupling means are provided which are actuated by the same rams 31 that move the caster wheels 21, so that when the caster wheels 21 are moved downwardly to lift the fixed wheels 11 from the ground, the coupling means are also actuated to rigidly couple the trailer T to the truck.

As best shown in FIGS. 1 and 2, the coupling means are conveniently formed by stationary clamping jaws 32, formed as integral flanges of the plates 29, and movable clamping jaws 33, formed as integral extensions of the lower links 26 of the parallelogram linkage systems which support each of the caster wheels 21. Thus, when the rams 31 are actuated to move the caster wheels 21 downwardly to lift the end of the truck and raise the fixed wheels 11 from the floor, the pivotal movement of the lower links 26 results in movement of the movable jaws 33 toward the stationary jaws 32 to grip a front frame member E of the trailer T tightly between the jaws, as shown in FIG. 2, so as to couple the trailer T rigidly to the truck. The truck and trailer may thereafter be steered as a functionally integral unit through cooperation between the steerable traction wheel 12 of the truck and fixed wheels W of the trailer. During such steering of the truck the caster wheels of the trailer, such as indicated at C, being free to swivel, do not interfere with the steering of the unit.

From the preceding description, it can be seen that there is provided a simple, inexpensive, but extremely efficient arrangement for raising the fixed wheels of a truck from the floor and coupling the truck rigidly to the trailer so that the truck and trailer may be easily steered as a functionally integral unit. The efficiency of the arrangement is enhanced by the linkage arrangement which allows both the lifting of the fixed wheels of the truck from the floor and the coupling of the truck to the trailer to be effected by the same rams, whereby these operations may be controlled by operation of a single valve without the necessity of the operator disembarking from the truck.

While one embodiment of the invention has been shown and described, it will be appreciated that this is for the purpose of illustration and that changes and modifications may be made therein without departing from the spirit and scope of the invention.

What I claim is:

1. A truck having fixed wheels at one end and a steerable traction wheel at the other end, means for driving said steerable traction wheel, coupling means on said truck for coupling a trailer rigidly to said one end of said truck, caster wheels on said one end of said truck, and means for moving said caster wheels vertically relatively to said fixed wheels to raise said fixed wheels of the truck off the floor and support said one end of said truck on said caster wheels whereby said truck and trailer may be steered as a unit by cooperation between the steerable wheel of the truck and fixed wheels of said trailer.

2. A truck having fixed wheels at one end and a steerable traction wheel at the other end, means for driving said steerable traction wheel, coupling means on said truck for rigidly coupling a trailer to said one end of said truck, caster wheels on said one end of said truck, means for actuating said coupling means to couple said trailer to said one end of said truck and for simultaneously moving said caster wheels vertically relatively to said fixed wheels to raise said fixed wheels of the truck off the floor and support said one end of said truck on said caster wheels whereby said truck and trailer may be steered as a unit by cooperation between the steerable wheel of the truck and fixed wheels of said trailer.

3. A truck having fixed wheels at one end and a steerable traction wheel at the other end, means for driving said steerable traction wheel, coupling means on said truck for rigidly coupling a trailer to said one end of said truck, said coupling means including a pair of clamping members secured to said truck and movable relatively to each other to clamp a portion of the trailer, caster wheels on said one end of said truck, and means for moving said caster wheels vertically downwardly relatively to said fixed wheels to raise said fixed wheels of the truck off the floor and support said one end of said truck on said caster wheels whereby said truck and trailer may be steered as a unit by cooperation between the steerable wheel of the truck and fixed wheels of said trailer.

4. A truck having fixed wheels at one end and a steerable traction wheel at the other end, means for driving said steerable traction wheel, coupling means on said truck for rigidly coupling a trailer to said one end of said truck, said coupling means including a pair of clamping members secured to said truck and movable relatively to each other to clamp a portion of the trailer, caster wheels on said one end of said truck, means for moving said caster wheels vertically relatively to said fixed wheels to raise said fixed wheels of the truck off the floor and support said one end of said truck on said caster wheels whereby said truck and trailer may be steered as a unit by cooperation between the steerable wheel of the truck and fixed wheels of said trailer, and links interconnecting said caster wheels and said clamping members for moving said clamping members to clamp a portion of said trailer when said caster wheels are moved vertically downwardly relatively to said fixed wheels.

5. A truck having fixed wheels at one end and a steerable traction wheel at the other end, means for driving said steerable traction wheel, coupling means on said truck for rigidly coupling a trailer to said one end of said truck, said coupling means including a pair of clamping members secured to said truck and movable relatively to each other to clamp a portion of the trailer, caster wheels on said one end of said truck, parallelogram systems supporting said caster wheels for vertical movement relatively to said fixed wheels, and means for effecting vertical movement of said caster wheels to raise said fixed wheels of the truck off the floor and support said one end of said truck on said caster wheels whereby said truck and trailer may be steered as a unit by cooperation between the steerable wheel of the truck and fixed wheels of said trailer.

6. A truck having fixed wheels at one end and a steerable traction wheel at the other end, means for driving said steerable traction wheel, caster wheels on said one end of said truck, parallelogram linkage systems supporting said caster wheels for vertical movement relatively to said fixed wheels, coupling means on said truck for rigidly coupling a trailer to one end of said truck, means for effecting vertical movement of said caster wheels to raise said fixed wheels of the truck off the floor and support said one end of said truck on said caster wheels whereby said truck and trailer may be steered as a unit by cooperation between the steerable wheel of the truck and fixed wheels of said trailer, said coupling means including stationary clamping members secured to said truck and movable clamping members movable relatively to the stationary clamping members, said movable clamping members being carried by extensions of links of said parallelogram linkage systems whereby said movable clamping members are moved toward said stationary clamping members to clamp a portion of said trailer when said caster wheels are moved vertically downwardly relatively to said fixed wheels.

References Cited in the file of this patent

UNITED STATES PATENTS

| | | |
|---|---|---|
| 1,186,482 | Kline | June 6, 1916 |
| 1,661,641 | Vecchi | Mar. 6, 1928 |
| 2,479,421 | Sempe | Aug. 16, 1949 |
| 2,669,314 | Quayle | Feb. 16, 1954 |
| 2,712,945 | Peterson | July 12, 1955 |
| 2,784,793 | Rando | Mar. 12, 1957 |
| 2,878,884 | Schreck | Mar. 24, 1959 |
| 2,956,631 | Ulinski | Oct. 18, 1960 |